United States Patent
Eichenberger et al.

(10) Patent No.: US 9,994,061 B2
(45) Date of Patent: Jun. 12, 2018

(54) SECURITY DOCUMENT WITH HOLOGRAPHIC FOIL AND PRINTED MACHINE-READABLE MARKINGS

(75) Inventors: Martin Eichenberger, Zollikon (CH); Hendrik Wiermer, Zürich (CH)

(73) Assignee: ORELL FUSSLI SICHERHEITSDRUCK AG, Zurich (CH)

( * ) Notice: Subject to any disclaimer, the term of this patent is extended or adjusted under 35 U.S.C. 154(b) by 0 days. days.

(21) Appl. No.: 13/808,122

(22) PCT Filed: Jul. 7, 2010

(86) PCT No.: PCT/CH2010/000175
§ 371 (c)(1),
(2), (4) Date: Jan. 30, 2013

(87) PCT Pub. No.: WO2012/003592
PCT Pub. Date: Jan. 12, 2012

(65) Prior Publication Data
US 2013/0207375 A1    Aug. 15, 2013

(51) Int. Cl.
*B42D 15/00* (2006.01)
*B42D 15/10* (2006.01)
(Continued)

(52) U.S. Cl.
CPC ........... *B42D 15/00* (2013.01); *B42D 25/328* (2014.10); *B42D 25/382* (2014.10);
(Continued)

(58) Field of Classification Search
CPC ...... B42D 15/00; B42D 15/10; B42D 25/328; B42D 25/382; B42D 2033/46; G09C 3/00; G03H 1/0011; G09F 3/0292
(Continued)

(56) References Cited

U.S. PATENT DOCUMENTS 6,358,607 B1 * 3/2002 Grotzner ............... G09F 3/0292
                                                   283/81
6,592,972 B1   7/2003 Trantoul
(Continued)

FOREIGN PATENT DOCUMENTS

CN    2146758 Y    11/1993
CN    1157972 A     8/1997
(Continued)

OTHER PUBLICATIONS

Notification of Reasons for Refusal dated Jun. 9, 2014 for Japanese Application No. 2013-516933.
(Continued)

*Primary Examiner* — Justin V Lewis
(74) *Attorney, Agent, or Firm* — Ladas & Parry LLP

(57) ABSTRACT

A security document has a substrate (1) with a foil element (6) applied to it. The foil element (6) includes a security feature, such as a diffractive structure (12), for example a hologram. To easily detect a removal of the foil element (6) using conventional detection devices, markings (4, 14, 15) intersecting with the foil element (6) are printed onto the top surface (7) of the foil element (6), the bottom surface (8) of the foil element (6), or onto the substrate (1), thus that they are removed together with the foil element (6).

18 Claims, 1 Drawing Sheet

(51) Int. Cl.
*G09C 3/00* (2006.01)
*G03H 1/00* (2006.01)
*G09F 3/00* (2006.01)
*B42D 25/328* (2014.01)
*B42D 25/382* (2014.01)

(52) U.S. Cl.
CPC ......... *G03H 1/0011* (2013.01); *G09F 3/0292* (2013.01); *B42D 2033/46* (2013.01)

(58) Field of Classification Search
USPC ........ 283/67, 70, 72, 74, 75, 82, 83, 94, 98, 283/901
See application file for complete search history.

(56) References Cited

U.S. PATENT DOCUMENTS

| | | | |
|---|---|---|---|
| 7,085,024 | B2 | 8/2006 | Ishimoto et al. |
| 7,699,351 | B2 | 4/2010 | Heierli et al. |
| 2001/0020895 | A1 | 9/2001 | Suzuki et al. |
| 2002/0018430 | A1 | 2/2002 | Heckenkamp et al. |
| 2003/0129344 | A1 | 7/2003 | Mori et al. |
| 2005/0225077 | A1 | 10/2005 | Eichenberger |
| 2007/0046477 | A1* | 3/2007 | Kolo et al. ................. 340/573.4 |
| 2008/0130074 | A1 | 6/2008 | Heierli et al. |
| 2008/0169639 | A1 | 7/2008 | Eichenberger |
| 2008/0246272 | A1* | 10/2008 | Vast .................. B42D 15/0073 283/94 |
| 2008/0316556 | A1 | 12/2008 | Eto et al. |
| 2009/0001709 | A1* | 1/2009 | Kretschmar .............. D21F 1/44 283/94 |
| 2009/0033085 | A1 | 2/2009 | Suto et al. |
| 2009/0045617 | A1* | 2/2009 | Lawandy ............. C09D 11/037 283/67 |

FOREIGN PATENT DOCUMENTS

| | | | | |
|---|---|---|---|---|
| CN | 1313574 A | 9/2001 | | |
| CN | 101329546 A | 12/2008 | | |
| DE | 10 2007 044 482 A1 | 3/2009 | | |
| EP | 2009516 A2 * | 12/2008 | ........... | B44C 1/1704 |
| FR | 2 793 726 A1 | 11/2000 | | |
| JP | 5-278380 A | 10/1993 | | |

OTHER PUBLICATIONS

English translation of an Office Action for Russian Application No. 2013105009.
English translation of an Office Action dated Aug. 7, 2014 for Chinese Application No. 201080068452.3.
espacenet English abstract of CN 101329546 A.
Machine translation of CN 101329546 A.
espacenet English abstract of CN 2146758 Y.
Partial English translation of CN 2146758 Y.
espacenet English abstract of CN 1157972 A.
Office Action dated Nov. 11, 2014 for European Application No. 10 730 035.2-1701.
espacenet English abstract of WO2009036966 A2.
Machine translation of DE 10 2007 044 482 A1.
espacenet English abstract of FR 2 793 726 A1.
Examination Report dated Jul. 3, 2015 for Australian Application No. 2010357157.
Office Action dated Jun. 12, 2015 for European Application No. 10 730 035.2-1701.
Patent Abstracts of Japan English abstract of JP 5-278380 A.

* cited by examiner

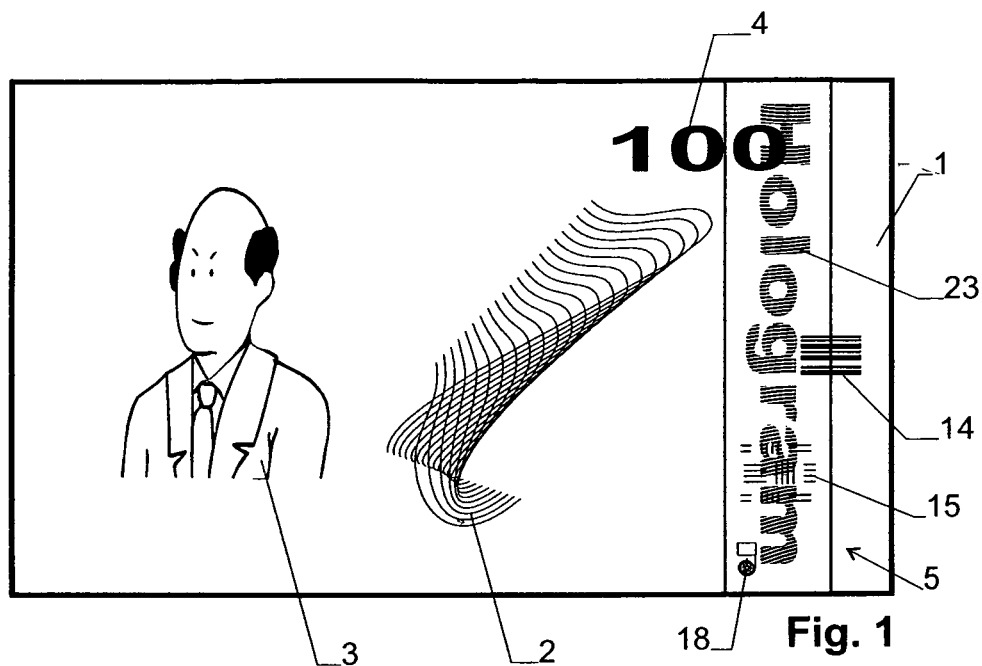
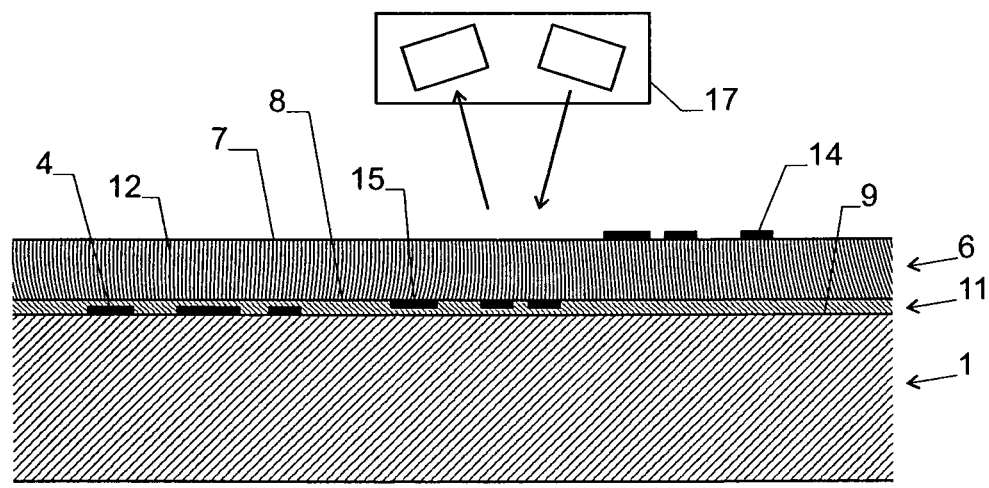

SECURITY DOCUMENT WITH HOLOGRAPHIC FOIL AND PRINTED MACHINE-READABLE MARKINGS

RELATED APPLICATION INFORMATION

This application is a 371 of International Application PCT/CH2010/000175 filed 7 Jul. 2010 entitled "Security Document With Holographic Foil And Printed Machine Readable Markings" which was published in the English language on 12 Jan. 2012, with International Publication Number WO 2012/003592 A1.

TECHNICAL FIELD

The invention relates to a security document, such as a banknote or an identification document, with holographic foil and printed machine-readable markings. The invention also relates to methods for manufacturing such a security document as well as for checking its authenticity.

BACKGROUND ART

It has been known to provide security documents with a foil element comprising a security feature formed by a diffractive structure, such as a surface or volume hologram or grating. Such foils cannot be forged by conventional printing or copying techniques, thereby rendering the documents more secure.

However, such documents may be tampered with if it is possible to remove the foil element without damaging it. Even though a removal of the foil element can be detected by verification devices, such devices need to be equipped with dedicated sensors for sensing the presence of the foil element, which renders such equipment more expensive.

DISCLOSURE OF THE INVENTION

Hence, it is a general object of the invention to provide a security document with a foil element comprising a security feature, such as a diffractive structure, that has improved counterfeit security.

This object is achieved by the security document of claim 1. That document comprises a substrate, such as a paper or plastic substrate, and a foil element. The foil element comprises the security feature and has a top surface facing away from the substrate and a bottom surface attached to the substrate. In addition, the security document comprises machine-readable markings arranged on the first surface or between the second surface and the substrate, i.e. above or below the foil element. These machine-readable markings intersect at least partially with the foil element, i.e. they cover at least part of the same surface region of the security document as the foil element. This makes it possible to more readily detect the presence of the foil element when the document's authenticity has to be verified by a machine, in particular by a conventional machine equipped for detecting conventional printed security markings. There is no need to equip the machine with means for detecting the security feature of the foil element.

In a further aspect, the invention also relates to a method for manufacturing such a security document. This method comprises the step of printing said markings to at least one of said top surface, said bottom surface, and said substrate.

In a first advantageous embodiment, at least part of the machine readable markings are printed onto the top surface of the foil element, thus that they are missing from the security document when the foil element is removed.

In a second advantageous embodiment, at least part of the machine readable markings are printed onto the bottom surface of the foil element. In that case, again, the markings will likely remain attached at least partially to the foil element if the foil element is removed from the substrate.

In another advantageous embodiment, at least part of the machine readable markings are printed onto the substrate. In that case, the adhesion of the markings to the substrate should be weaker than the adhesion of the markings to the foil element, i.e. when the foil element is removed from the substrate by mechanical force, a major part (more than 50%) of the markings printed to the substrate should be lifted off together with the foil element. This, again, allows to easily detect the removal of the foil element.

The invention also relates to a method for automatically verifying the authenticity of the security document. This method comprises the step of checking for a presence of the markings by means of a sensor device. If the markings are at least in part missing, it can be assumed that the document is not authentic or at least damaged.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 1 shows a top view of a security document and FIG. 2 shows a sectional view of a security document with a substrate and a foil element.

MODES FOR CARRYING OUT THE INVENTION

Definitions:

The term "security document" encompasses any type of document that contains a security feature that makes it difficult to reproduce. Examples for security documents of this type are banknotes, passports, checks, stock certificates, tickets, credit cards, ID cards, good certificates, stamps, vouchers, shares, driving licenses, residence permits, birth certificates, or insurance certificates. The present invention is, however, of particular advantage when applied to banknotes.

The term "diffractive structure" as used herein and in the claims is to designate a periodic structure with a periodicity in the order of the wave-length of visible light, in particular between 0.1 µm and 10 µm. Such periodic structures give rise to diffractive interference effects. As known to the skilled person, the structure may e.g. be a surface structure, such as e.g. known from surface gratings, surface holograms or kinegrams, or it may be a structure in the volume of the foil element, in particular an absorptive or refractive grating, such as it is e.g. known from volume holograms.

The terms "top", "above", "below", "bottom" etc. refer to a direction extending perpendicularly to the substrate of the document, with the foil element being, by definition, above the substrate. Hence, the surface of the foil element that faces away from the substrate is called the "top surface" of the foil element, while the surface of the foil element that faces the substrate is called its "bottom surface".

Security Document:

The security document shown in FIG. 1 comprises a flexible or rigid substrate 1 of paper or plastics, or a combination of such materials, such as in a multilayer structure, onto which graphical elements, for example in the shape of security designs 2, illustrations 3 and indications of value 4, are printed in known manner. In addition the document possesses a security feature 5, the design of which is described in the following.

As shown in FIG. 2, security feature 5 comprises a foil element 6 having a top surface 7 and a bottom surface 8. It is attached to the top surface 9 of substrate 1, e.g. by means of an adhesive layer 11.

A security feature in the form of a diffractive structure, such as a volume hologram 12, is arranged in foil element 6. As mentioned above, other diffractive structures can be provided in foil element 6 alternatively to or in addition to volume hologram 12.

Even though FIG. 2 shows foil element 6 as consisting of a single layer, foil element 6 can also comprise several layers, such as protective layers, partially metalized layers or carrier layers. Adhesive layer 11 can also be part of foil element 6.

Advantageously, foil element 6 has a thickness of no more than 100 μm, in particular no more than 25 μm, which renders it difficult to remove, in particular without damaging it.

As shown in FIGS. 1 and 2, security markings 4, 14, 15 can be printed above and/or below foil element 6. As mentioned above, the security markings can be printed:

Onto top surface 7 of foil element 6, such as shown for security markings 14: This location has the advantage that the security markings 14 are readily accessible for detection and are certain to be removed from the security device when a counterfeiter tries to remove foil element 6.

Onto bottom surface 8 of foil element 6, such as shown for security markings 15: This design has the advantage that the markings are protected from mechanical damage by means of foil element 6, and still they typically adhere more strongly to foil element 6 and to substrate such that they are certain to be removed from the security device when a counterfeiter tries to remove foil element 6. If adhesive layer 11 is part of foil element 6, printing can also take place onto the bottom surface of adhesive layer 11, in which case the location of the markings corresponds to those of markings 4 in FIG. 2.

Onto substrate 1, again such as shown for security marking 4: In this case the adhesion of the markings to substrate 1 should be weaker than their adhesion to foil element 6. This can e.g. be achieved by appropriately selecting the ink for the security markings as well as the material of adhesive layer 11. If adhesive layer 11 bonds sufficiently well to the security markings as well as to foil element 6, a major part of adhesive layer 11 and of the markings will be removed from substrate 1 when foil element 6 is lifted off by force. For example, both the ink for the markings 4 and the material for adhesive layer 11 can comprise a resin that crosslinks upon illumination with UV light.

The security markings should be machine readable, i.e. they should be readily detectable by means of automated sensor devices. For easy and reliable detection, the security markings can e.g. any use combination of the following techniques:

The markings can comprise a magnetic ink. Magnetic inks are known by the skilled person. In particular, magnetic inks may comprise inks that have a high magnetic remanence ("hard" magnetic inks), e.g. of at least 1000 Gauss, or inks that have a low magnetic remanence but a high magnetic permeability μ ("soft" magnetic inks), e.g. of at least 2, in particular much higher than 2.

The markings can comprise a fluorescent ink. Upon illumination with light of a first given wave-length $\lambda_1$, such dies emit light of a second, typically longer wavelength $\lambda_2$.

The markings can comprise an infrared absorbing dye, i.e. a dye showing strong absorptive bands in the infrared spectral range.

The markings can comprise an electrically conductive layer, such as printed by an electrically conductive ink. Such layers can be detected electrically, i.e. using conductivity measurements. In a particularly advantageous embodiment, the security document can comprise a resonant circuit, with the conductive layer of the markings forming at least part of the resonant circuit. Such resonant circuits can be detected using RF measurements. Examples for manufacturing resonant circuits using printing techniques are disclosed in WO 03/096268. FIG. 1 shows, by way of example, an illustration of such a circuit at reference number 18.

The markings can also comprise liquid crystal pigments with polarization-dependent optical properties.

The markings can also comprise so-called taggings, such as optical up-converters or down-converters.

Advantageously, at least part of the markings are invisible to the naked eye. For example, markings 15 can be such that, in the visible spectral range, they do not differ from other markings in their surroundings, while they show a strong absorptive band in the infrared spectral range.

However, other markings, such as markings 4, can be readily visible to the human observer.

In a further advantageous aspect, at least part of the markings are machine detectable through foil element 6, i.e. a suitable sensor is able to detect them from the top side of the security document, by probing the markings through foil element 6. For example, if markings 15 comprise a magnetic dye and foil element 6 is of a polymeric material, an inductive sensor is readily able to detect the markings through foil element 6.

The markings can form any desired pattern, such as patterns readable to the human eye (for example a printed number), or they can form codes typically read by a machine only (such as a bar code).

Manufacturing:

The security document shown in FIG. 1 or 2 can e.g. be manufactured by using the following steps:

In a first printing step, e.g. using offset print, ink is applied to substrate 1. Typically, such a step applies background colors and patterns and at least part of the visually-perceptible elements of the final document.

The first step can also comprise the printing of security markings, such as the markings 4, onto substrate 1, at a location that intersects with the later applied foil element 6. If the markings 4 printed onto substrate 1 are to comprise dyes that are difficult to apply by means of offset print, other printing techniques can be used for applying them, such as screen printing or intaglio printing. However, in that case, because dyes applied with screen printing or intaglio printing are likely to weaken the adhesive force between foil element 6 and substrate 1, the area covered by such markings should be much smaller than the area covered by foil element 6 as a whole.

In a next step, foil element 6 is applied to substrate 1. Before doing so, markings (such as markings 15) may be printed to bottom surface 8 of foil element 6.

An advantageous method for applying foil element 6 to substrate 1 is a transfer method, where foil element 6 delivered as a laminate with its top surface 7 connected to a carrier layer. Then, bottom surface 8 of foil element 6 is mounted to substrate 1, e.g. using adhesive layer 11, whereupon the carrier layer can be removed. This technique allows for the application of even very thin foil elements 6.

Adhesive layer 11 can e.g. be a hot-melt layer and/or a UV-curable resin layer. In the first case, heat is applied for applying foil element 6 to substrate 1, in the second case UV-radiation is used for curing adhesive layer 11. Typical adhesives can e.g. comprise at least one component from the group comprising polyurethane, acrylates, polyvinyl-alcohols, polyvinyl-acetates oder polyvinyl-pyrolidones.

After applying foil element 6, any security markings (such as markings 14) to printed onto its top surface 7 can be applied, using any printing technique, such as offset printing, screen printing or intaglio printing.

Finally and optionally, a varnish layer can be applied over at least part of the security document, in particular for protecting any markings printed onto top surface 7 of foil element 6.

Notes:

In the example above, the security feature of foil element 6 has been formed by a diffractive structure. It must be noted, though, that the security feature can be formed by other techniques. For example, the security feature may comprise any optically variable device (OVD), such as a thin-film element with UV-fluorescence, or an optical light guide, see e.g. WO 2006/056089.

The authenticity of the security document can be verified by checking for the presence of the markings 4, 14, 15 in the region of foil element 6 by means of a suitable sensor device, as indicated by reference numeral 17 of FIG. 2. If at least part of the markings is missing, it can be assumed that the document has been tampered with.

As mentioned above, the markings 4 and 15 situated between substrate 1 and foil element 6 can be checked by performing a measurement through the foil element 6. Alternatively, a detection can also take place by measuring through substrate 1 if substrate 1 allows the passage of the required signals.

One advantage of the present technique is the fact that it uses conventional printing technology for improving the security of a diffractive foil element, thus that it can be implemented easily. Still, it allows to reliably detect a removal of foil element 6 using conventional authentication devices.

While there are shown and described presently preferred embodiments of the invention, it is to be distinctly understood that the invention is not limited thereto but may be otherwise variously embodied and practiced within the scope of the following claims.

The invention claimed is:

1. A security document comprising
   a substrate,
   a foil element comprising a security feature, wherein said foil element has a first surface facing away from said substrate and a second surface attached to said substrate,
   printed machine-readable markings between said second surface and said substrate, wherein said markings abut said substrate,
   wherein said markings intersect at least partially with said foil element,
   wherein at least part of said markings are printed onto said substrate such that there is a direct contact between the at least part of said markings and said substrate, wherein, for said part of said markings printed onto said substrate, an adhesion of said markings to said substrate is weaker than an adhesion of said markings to said foil element.

2. The security document of claim 1, wherein at least part of said markings are machine detectable through said foil element.

3. The security document of claim 1, wherein at least part of said markings comprises a magnetic dye.

4. The security document of claim 1, wherein at least part of said markings comprises a fluorescent ink.

5. The security document of claim 1, wherein at least part of said markings is invisible when viewed in the wavelengths visible to a human eye.

6. The security document of claim 1, wherein at least part of said markings comprises an infrared absorbing dye.

7. The security document of claim 1, wherein said security feature comprises an optically variable device.

8. The security document of claim 1, wherein at least part of said markings comprises an electrically conductive layer.

9. The security document of claim 8, wherein said security document comprises a resonant circuit and wherein said conductive layer forms at least part of said resonant circuit.

10. The security document of claim 1 wherein said security document is selected from the group consisting of banknotes, passports, checks, stock certificates, tickets, credit cards, ID cards, good certificates, stamps, vouchers, shares, driving licenses, resident permits, birth certificates and insurance certificates.

11. The security device of claim 7 where said optically variable device is a diffractive structure or an optical thin-film element, or an optical waveguide.

12. The security document according to claim 1, wherein the security document comprises an adhesive layer which attaches the second surface of the foil element to the substrate with a top surface of the adhesive layer contacting the second surface of foil element and a bottom surface of the adhesive layer contacting a top surface of the substrate, the markings being disposed along the bottom surface of the adhesive layer.

13. A method for manufacturing a security document, comprising the steps of:
    providing a substrate;
    printing markings onto said substrate such that there is a direct contact between the markings and said substrate; and
    after printing said markings onto said substrate, applying a foil element comprising a security feature to said substrate, wherein said substrate markings intersect at least partially with said foil element and wherein, after applying said foil element to said substrate, an adhesion of said markings to said substrate is weaker than an adhesion of said markings to said foil element.

14. The method of claim 13, wherein said foil has a first surface that is oriented away from said substrate and a second surface that is oriented to be adhered to said substrate and at least part of said markings is printed onto said second surface prior to attaching said foil element to said substrate.

15. The method of claim 14, wherein said foil element comprises an adhesive layer having a first surface oriented towards the foil and a second surface oriented towards the substrate and wherein at least part of said markings is printed onto a second surface of said adhesive layer.

16. The method according to claim 13 wherein the foil element has a first surface that is oriented away from the substrate and a second surface that is oriented toward the substrate, and the foil element is applied to said substrate with an adhesive that forms an adhesive layer which attaches the second surface of the foil element to the substrate with a top surface of the adhesive layer contacting the second surface of the foil element and a bottom surface of the adhesive layer contacting a top surface of the substrate, the markings being disposed along the bottom surface of the adhesive layer.

17. A method for automatically verifying the authenticity of the security document of claim 4, comprising the step of checking for a presence of said markings in the region of said foil element by means of a sensor device.

18. The method of claim 17, comprising the step of checking for said markings arranged between said foil element and said substrate by performing a measurement through said foil element.

* * * * *